SYSTEM FOR SELECTIVELY MODIFYING AMPLITUDE OF TV CHROMINANCE SUBCARRIER TO OVERCOME COLOR DESATURATION BY SYNTHESIZING LIKE-FREQUENCY COMPENSATING SIGNAL WITH SUBCARRIER

Filed March 20, 1961

INVENTOR.
DAVID H. BRUNNER

BY Owen V. Hazeltine

ATTORNEY

United States Patent Office 3,143,598

Patented Aug. 4, 1964

3,143,598

SYSTEM FOR SELECTIVELY MODIFYING AMPLITUDE OF TV CHROMINANCE SUBCARRIER TO OVERCOME COLOR DESATURATION BY SYNTHESIZING LIKE-FREQUENCY COMPENSATING SIGNAL WITH SUBCARRIER

David H. Brunner, Abington Township, Montgomery County, Pa., assignor, by mesne assignments, to Philco Corporation, Philadelphia, Pa., a corporation of Delaware Filed Mar. 20, 1961, Ser. No. 96,937

10 Claims. (Cl. 178—5.4)

Figure 1:
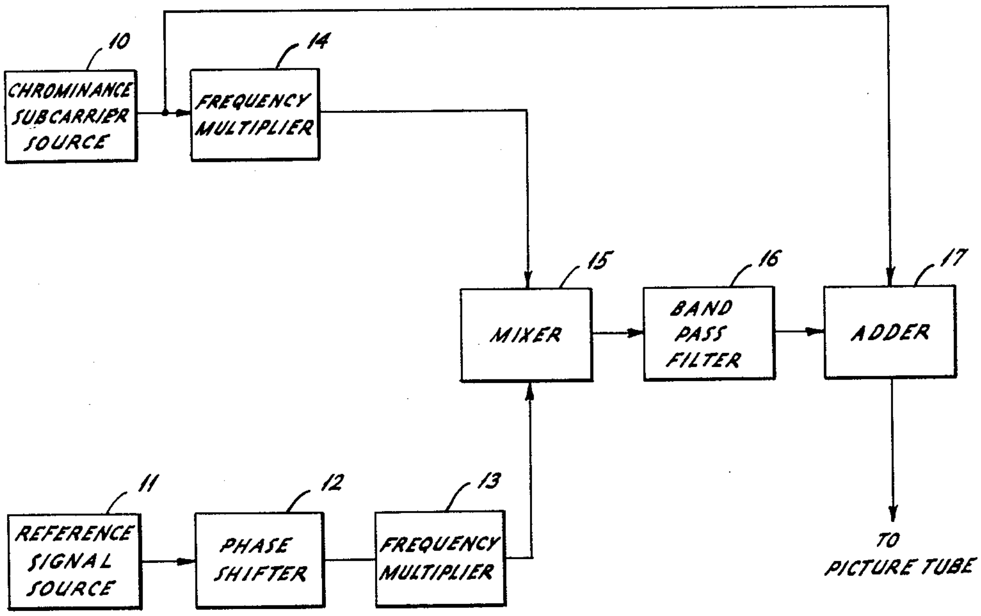

This invention relates to improvements in communications systems employing a carrier which at predetermined different phases represents different intelligence components. More particularly it relates to improvements in color television systems of the type employing a chrominance-representative subcarrier wave and to novel means for modifying said subcarrier wave so as to improve color image reproduction.

In color television a subcarrier wave is used which varies in phase to represent variations in hue of the televised image and varies in amplitude, relative to the amplitude of a signal representing image luminance, to represent variations in saturation of said image. More particularly, at three substantially different phases said subcarrier wave represents the red, green and blue primary colors, respectively, and at other phases, intermediate those at which it represents said primary colors, it represents mixtures of two or more of said primary colors. Said subcarrier wave, together with a luminance or brightness-representative signal, is used to convey the total information representative of a televised scene.

Under certain circumstances it may be desirable to alter the amplitude of the subcarrier wave for certain phases relative to its amplitude for other phases. For example, when such a subcarrier, together with a luminance signal, is supplied in known manner to a line phosphor type color picture tube to reproduce color television pictures, desaturation of the reproduced picture may result because the electron beam of the tube part of the time simultaneously excites two or more adjacent color phosphor lines emissive of light of different colors when the subcarrier modulating said beam represents a pure primary color. Such desaturation can be overcome by increasing the amplitude of the subcarrier relative to that of the luminance signal in proportion to the degree of desaturation. Means are known for increasing the subcarrier amplitude relative to the luminance signal amplitude. However such means increase said subcarrier amplitude to the same extent regardless of the phase of the subcarrier, whereas the degree of desaturation caused by the picture tube varies with said phase, being substantially less for subcarrier phases representing complementary colors than for subcarrier phases representing pure primary colors. Accordingly if said means are designed to provide exact compensation for desaturation of the pure primary colors, they overcompensate for desaturation of the complementary colors. Conversely if said means are designed to compensate exactly for the lesser degree of desaturation undergone by the complementary colors, they provide incomplete compensation for the desaturation undergone by the pure primary colors. It would be desirable to provide means capable of selectively enhancing the subcarrier amplitude for subcarrier phases representing primary colors without modifying the subcarrier amplitude for intermediate phases at which it is representative of complementary colors.

Accordingly it is a primary object of the invention to provide means for varying the amplitude of a carrier wave of variable phase to an extent dependent upon said phase.

Another object is to provide means for increasing the amplitude of a chrominance-representative subcarrier wave to a greater extent for certain phases than for intermediate phases.

Still another object is to provide means for increasing the amplitude of a chrominance-representative subcarrier to a greater extent for phases at which it represents a primary color than for phases at which it represents complementary colors.

By the invention means are provided for selectively enhancing or diminishing the amplitude of a frequency- and phase-modulated subcarrier for certain phases relative to its amplitude for intermediate phases. To accomplish this a signal is produced at an integral multiple greater than two of the nominal frequency of the subcarrier wave and of reference phase for said wave. This signal is heterodyned with a signal derived from said subcarrier wave and having a frequency differing from that of said reference signal by an amount equal to said nominal subcarrier frequency. From the resultant heterodyne components a component at the frequency of the original subcarrier is selected and combined with said original subcarrier. By appropriate choice of the phase and amplitude relations between the two signals which are heterodyned with each other, the signal resulting from said combination may be caused to correspond to the original subcarrier, increased or diminished in amplitude for certain phases relative to its amplitude for intermediate phases.

Thus, where it is desired to enhance the amplitude of a color-representative subcarrier wave for phases corresponding to primary colors the reference signal is produced at three times the nominal frequency of the subcarrier wave and is heterodyned with a signal derived from said subcarrier wave and having a frequency either twice or four times that of the subcarrier. The derived heterodyne component at the frequency of the original subcarrier is combined with the original subcarrier in such manner as to enhance the amplitude thereof for phases at which the subcarrier represents the primary colors red, green and blue.

For further details reference is made to the accompanying drawings wherein

Figure 2:
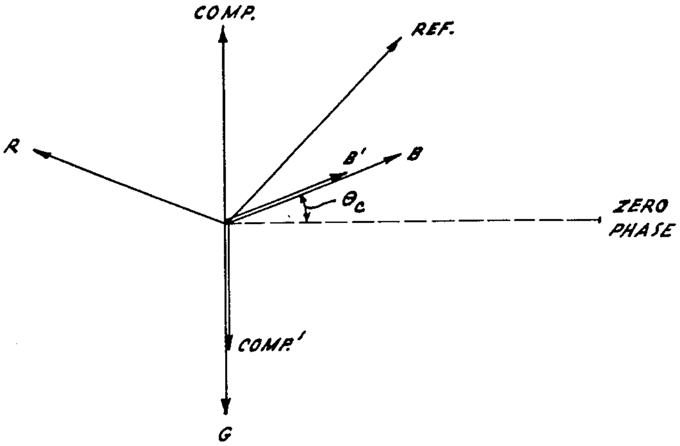

FIG. 1 is a block diagram showing the application of my invention to a color television receiver; and FIG. 2 is a vector diagram which will be used in explaining FIG. 1.

Referring to FIG. 1, block 10 represents a source of the chrominance-representative subcarrier wave in a color television receiver. This source may be of any conventional form. For example, if the receiver is for the present-day standard color television signal, block 10 may comprise any one of the known circuits for separating the chrominance subcarrier from other components of said signal, such as the luminance component, the color synchronizing bursts and the deflection synchronizing pulses. As will be explained more fully hereinafter the invention is particularly applicable to a subcarrier which represents those primary colors at phases equally mutually displaced by 120°. The now standard subcarrier is not so characterized but represents said different primary colors at phases displaced from each other by angles different from 120°. Accordingly, in one embodiment of the invention, the source 10 in FIG. 1 may include means for transforming said standard subcarrier into one representative of the primary colors at phases equally mutually displaced by 120°. Apparatus for performing this transformation is disclosed in Moulton et al. Patent No. 2,798,201, granted July 2, 1957, assigned to the assignee of this invention.

FIG. 2 shows the colors represented at various phases by the output signal from block 10. In this figure the phase of vector B is that at which said signal represents pure blue, the phase of vector R is that at which said signal represents pure red, and the phase of vector G is that at which said signal represents pure green. Relative to an arbitrary zero reference phase represented in FIG. 2 by the broken line segment labeled "ZERO PHASE," these three vectors have phase displacements equal to $\theta_c$, $\theta_c+120°$ and $\theta_c+240°$, respectively. At phases intermediate those of the vectors B, R and G the signal represents mixtures of the pure primary colors. In particular, at a phase opposite that at which it represents a given primary color, said signal represents the color complementary to said primary color. Thus in FIG. 2 the phase of the vector labeled "COMP." is that at which the signal represents purple, the complement of green.

Referring again to FIG. 1, block 11 represents a source of a signal having the same frequency as the signal produced by source 10 and a phase fixed in relation to the reference phase of the latter signal. Source 11 may be the oscillator synchronized in frequency and phase by the received color synchronizing bursts which is conventionally included in receivers for the standard color television signal. The signal produced by this oscillator is supplied to a conventional phase shifting circuit 12 designed to shift its phase to cause it to coincide with the nearest phase at which the signal from source 10 represents a pure primary color. In any case such phase shift will not exceed $\pm 60°$. The output of the phase shifter 12 is supplied to a frequency multiplying circuit 13 of any conventional form suitable for multiplying the frequency of said signal by a factor of 3. For example, circuit 13 may be a non-linear amplifier circuit having a parallel-resonant output load circuit tuned to three times the frequency of the signal applied to its input.

The signal produced by source 10 is supplied to a frequency multiplying circuit 14 of any conventional form suitable for multiplying the frequency of the signal supplied thereto by a factor of either 2 or 4—e.g., a non-linear amplifier with a resonant circuit output load tuned to the appropriate multiple of the input signal frequency.

The output signals from frequency multipliers 13 and 14 are supplied to a mixer 15 of any conventional form suitable for heterodyning said supplied signals, and the output signals produced by mixer 15 are in turn supplied to a band-pass filter 16 of any conventional construction transmissive only of signals in the frequency range of the subcarrier from source 10.

Finally the output signal from band-pass filter 10 and a signal derived directly from source 10 are supplied to a conventional adding circuit 17 responsive thereto to produce a signal proportional to their sum which may be supplied in any conventional manner to a suitable picture reproducing tube (not shown).

The system of FIG. 1 operates as follows. From FIG. 2 it is apparent that the reference signal produced by source 11 in FIG. 1 (represented by the vector "REF.") never differs in phase by more than 60°, leading or lagging, from the nearest phase (R, G or B in FIG. 2) at which the signal from source 10 is representative of a primary color. By means of phase shifter 12, the phase of said reference signal is shifted to make it coincide with the phase at which the signal from source 10 is representative of one of the primary colors B, G or R. The phase-shifted reference signal then has a phase of $\theta_c$, $\theta_c+120°$ or $\theta_c+240°$, depending on the primary color phase with which it has been made to coincide. Tripling the frequency of said reference signal by means of circuit 13 of FIG. 1 also triples its nominal phase angle, which becomes equal to $3\theta_c$, $3\theta_c+360°$, or $3\theta_c+720°$, depending on its initial phase. Although the foregoing expressions representing the phase of the triple-frequency reference signals differ in form, they denote the same phase angle, since signals differing from each other in phase by integral multiples of 360° may be regarded as having the same phases. Thus, regardless of which of three possible phases the signal has at the input to circuit 13, the phase of the signal at the output of said circuit is $3\theta_c$.

On the other hand, the phase angle of the output signal from frequency multiplier 14 of FIG. 1 (relative to the zero phase indicated in FIG. 2) is either twice or four times the phase angle of the input signal to said frequency multiplier 14, depending on whether the frequency multiplication performed in said multiplier 14 is by a factor of 2 or a factor of 4. Assuming, for example, a frequency multiplication by a factor of 2 and an input signal phase of $\theta_c$ (i.e., a subcarrier representing blue) the output signal from multiplier 14 has twice the nominal frequency of the received subcarrier and a phase angle of $2\theta_c$. When this signal is heterodyned with the triple-frequency signal of phase $3\theta_c$ from multiplier 13, there is produced a heterodyne component whose frequency equals the difference between the nominal frequencies of the heterodyned signals and whose phase equals the difference between their respective phase angles. This heterodyne component therefore has the same nominal frequency as the received subcarrier and a phase $\theta_c$, i.e., the phase at which the original subcarrier represents blue. This difference frequency heterodyne component is represented in FIG. 2 by the vector B′, which is really co-linear with vector B, although it has been shown slightly displaced from the latter for clarity of illustration. This difference frequency heterodyne component is selectively derived from mixer 15 by band-pass filter 16 in FIG. 1. Since it is in phase with the subcarrier from source 10 when the latter represents blue, its addition to said subcarrier in adder 17 of FIG. 1 enhances the amplitude of said subcarrier under those circumstances.

Similarly it may be shown that mixer 15 also produces difference frequency heterodyne components which are in phase with the subcarrier from source 10 whenever the phase of said subcarrier differs by 120° from the phase at which it represents blue. As pointed out above, at such other phases said subcarrier represents red and green respectively. Therefore heterodyne components in phase with the original subcarrier are produced whenever the phase of said subcarrier is such that it represents a primary color. Addition of these in-phase components to the original subcarrier in adder 17 of FIG. 1 increases the amplitude of the latter.

It will now be shown further that when the phase of the subcarrier is such that it represents a complementary color, the apparatus described above produces a heterodyne component of opposite phase to said subcarrier, which when combined with the latter in adder 17 reduces its amplitude rather than increasing it. As has been pointed out, the phase at which the subcarrier represents a typical complementary color, such as purple, is represented in FIG. 2 by the orientation of vector "COMP.," the phase angle of which is $\theta_c+60°$. Frequency multiplier 14 of FIG. 1 doubles the frequency of this signal and also doubles its phase angle to a value of $2\theta_c+120°$. Mixer 15 of FIG. 1 then heterodynes this double frequency signal with the triple frequency reference signal from circuit 13, thereby producing a difference frequency heterodyne component at the original subcarrier frequency and having a phase angle equal to the difference between the phase angle $3\theta_c$ of said triple frequency signal and the phase angle $2\theta_c+120°$ of the double frequency signal, i.e., a phase angle of $\theta_c-120°$. In FIG. 2 this heterodyne component of phase $\theta_c-120°$ is represented by the vector "COMP.′ " having an orientation opposite to that of the "COMP." vector. Being of opposite phase to the original subcarrier, the signal represented by vector "COMP.′" reduces the amplitude of said subcarrier when it is added thereto in adder 17 of FIG. 1. Difference frequency components of opposite phase to the subcarrier are also produced whenever the phase of said subcarrier is displaced by 120° from that of the vector "COMP." in FIG. 2—a condition which occurs whenever said subcarrier represents complementary image color. Accordingly whenever the subcarrier is of a phase such that it represents a complementary color, its amplitude will be reduced by the addition of an oppositely phased signal produced as described above.

The amount by which the apparatus of FIG. 1 increases the amplitude of the subcarrier when its phase is such that it represents a primary color (or reduces said amplitude when the subcarrier phase is such that it represents a complementary color) is determined by the amplitude of the difference frequency heterodyne component produced by mixer 15 in FIG. 1. This amplitude may be controlled in various ways. For example a simple potentiometer control in the output of filter 16 may be used. Alternatively the gain of mixer 15 for difference frequency heterodyne components may be controlled, or the amplitudes of the frequency-multiplied signals produced by circuits 13 and/or 14 may be controlled. The last-mentioned control may be effected conveniently by adjustment of the resistive loading of the tuned circuits across which the frequency-multiplied signals are developed.

Phase shifter 12 may be omitted and appropriate detuning of the resonant circuit in frequency multiplier 13 may be relied on to cause the signals supplied to mixer 15 from multipliers 13 and 14 to have the phase relationships detailed above.

The direct connection from source 10 to adder 17 in FIG. 1 may also be omitted and the signal supplied through this connection provided instead by feed-through of the output signal from source 10 through frequency multiplier 14, mixer 15 and band-pass filter 16. Such feed-through will occur if a resistive element is included in the load circuit of the frequency multiplier 14 and mixer 15 is unbalanced for signals supplied to it from said multiplier 14.

As explained above, in the embodiment described heretofore it has been assumed that block 10 in FIG. 1 comprises means such as taught in Moulton et al. Patent No. 2,798,201 for transforming the standard chrominance subcarrier into one which represents the three primary image colors red, green and blue, respectively, at phases mutually displaced by 120°.

The reason for putting the subcarrier in the latter form, before it is processed by the apparatus of FIG. 1, is as follows. The amount of desaturation which occurs in a line phosphor type color tube by reason of the substantial width of its color phosphor strips and its electron beam is substantially the same for the three different primary colors, red, green and blue. Therefore the amount by which the subcarrier amplitude should be increased to compensate accurately for this desaturation is the same for all three primary colors. However the apparatus of FIG. 1 produces equal increases in subcarrier amplitude only when said subcarrier represents the primary colors at phases mutually displaced by 120°. If the standard subcarrier were processed directly, equal increases in amplitude thereof would not be produced and desaturation would not be accurately compensated.

By making certain modifications in the apparatus of FIG. 1 it may be made to perform the same function as the means taught by Moulton, and the latter may then be omited from source 10. To do this multiplier 13 is modified to render it capable of producing not only the reference signal at three times the subcarrier frequency discussed previously, but also a second reference signal at twice said subcarrier frequency. This may be accomplished by connecting an additional parallel resonant circuit, tuned to twice said subcarrier frequency, in series with the output load of said multiplier circuit. Multiplier 14 is modified to render it capable of producing a signal at the same frequency as the subcarrier, in addition to the signal at two (or four) times said frequency discussed previously. This may be accomplished by adding a D.-C. load to the output load of said multiplier 14. The two additional signals thus produced, namely the subcarrier frequency signal from multiplier 14 and the double frequency reference signal from multiplier 13, are heterodyned with each other in mixer 15. The resultant difference-frequency heterodyne component has a nominal frequency equal to that of the original subcarrier and is therefore capable of passing through band-pass filter 16, which is transmissive of signals at that frequency, as previously explained. This additional heterodyne component transmitted through filter 16 is combined in adder 17 with the other two signals combined therein, as previously explained. If the two additional signals from multipliers 13 and 14 which produce said additional heterodyne component are established in the amplitude and phase relations taught for the two similarly related signals in said Moulton et al. patent, the combined signal produced by adder 17 differs from the standard subcarrier in both of the respects discussed above—that is it represents the primary color at phases mutually displaced by 120° and its amplitude is increased equally for each of said phases. The above-mentioned amplitude and phase relationships taught in the Moulton et al. patent can be established readily in the apparatus of FIG. 1 by appropriate adjustment of the added D.-C. load of multiplier 14 and appropriate detuning of the added resonant circuit in the output load of multiplier 13.

Other modifications of the apparatus of FIG. 1 will occur to those skilled in the art without departing from my inventive concept and accordingly I desire the latter to be limited only by the appended claims.

I claim:

1. In a communication system employing a carrier which at predetermined phases represents certain intelligence, means for increasing the amplitude of said carrier at said predetermined phases relative to its amplitude at intermediate phases, comprising: means responsive to said carrier and to a signal of reference phase for said carrier to produce a signal of carrier frequency having the same phase as said carrier when said carrier is of one of said predetermined phases and having opposite phase to said carrier when said carrier is of an intermediate phase; and means for additively combining said carrier and said produced signal.

2. In a communication system employing a carrier which at predetermined phases represents certain intelligence, means for increasing the amplitude of said carrier at said predetermined phases relative to its amplitude at intermediate phases, comprising: means for producing a signal of carrier frequency and reference phase for said carrier; means responsive to said carrier and said signal of reference phase to produce a signal of carrier frequency having the same phase as said carrier when said carrier is of one of said predetermined phases and having opposite phase to said carrier when said carrier is of an intermediate phase; and means for additively combining said carrier and said last-named produced signal.

3. A system according to claim 2 in which the phase of said signal of reference phase is substantially the same as one of said predetermined phases of said carrier.

4. In a communication system employing a carrier which at predetermined phases represents certain intelligence, means for increasing the amplitude of said carrier at said predetermined phases relative to its amplitude at intermediate phases, comprising: means for producing a signal at the frequency of said carrier and having one of said predetermined phases; means for deriving from said produced signal a signal at a frequency which is an integral multiple greater than two times the frequency of said produced signal; means for deriving from said carrier a signal at a frequency differing by the value of said carrier frequency from that of said signal derived from said produced signal; means responsive to both said derived signals to produce a signal of carrier frequency having the same phase as said carrier when said carrier is of one of said predetermined phases and having opposite phase to said carrier when said carrier is of an intermediate phase; and means for additively combining said carrier and said last-named produced signal.

5. A system according to claim 4 in which said means responsive to said derived signals comprises heterodyning means supplied with said derived signals, and including means for deriving from said heterodyning means the difference frequency heterodyne components produced thereby.

6. In a color television system employing a composite signal comprising a subcarrier which at different phases represents different hues and at different amplitudes represents different saturations of a televised image, and a color synchronizing signal of reference phase for said subcarrier, means for increasing the amplitude of said subcarrier at certain phases relative to its amplitude at intermediate phases, comprising: means for doubling the frequency of said subcarrier; means for tripling the frequency of said color synchronizing signal; means for heterodyning said double and triple frequency signals; means for deriving the difference frequency heterodyne component produced by said heterodyning means; and means for combining said difference frequency component with a signal proportional to said subcarrier.

7. In a color television system employing a composite signal comprising a subcarrier which at different phases represents different hues and at different amplitudes represents different saturations of a televised image, and a color synchronizing signal of reference phase for said subcarrier, means for increasing the amplitude of said subcarrier at certain phases relative to its amplitude at intermediate phases, comprising: means for quadrupling the frequency of said subcarrier; means for tripling the frequency of said color synchronizing signal; means for heterodyning said quadruple and triple frequency signals; means for deriving the difference frequency heterodyne component produced by said heterodyning means; and means for combining said difference frequency component with a signal proportional to said subcarrier.

8. In a color television system employing a subcarrier which at predetermined equally mutually displaced phases represents the red, green and blue primary image colors, respectively, and which at different amplitudes represents different saturations of said image, means for increasing the amplitude of said subcarrier at said predetermined phase relative to its amplitude at other phases, comprising: means for producing a signal of subcarrier frequency and having one of said predetermined phases; means for deriving from said produced signal a first signal having three times the frequency of said produced signal; means for heterodyning said derived signal with a second signal derived from said subcarrier at a frequency differing from that of said first signal by an amount equal to said subcarrier frequency; means for deriving the difference frequency heterodyne component produced by said heterodyning means; and means for combining said difference frequency components with a signal proportional to said subcarrier.

9. In a color television system employing a subcarrier which at different phases represents different hues and at different amplitudes represents different saturations of a televised image, means for increasing the amplitude of said subcarrier at certain phases relative to its amplitude intermediate phases, comprising: a source of a subcarrier which at predetermined equally mutually displaced phases represents the red, green and blue primary image colors, respectively, and which at different amplitudes represents different saturations of said image, means for producing a signal of subcarrier frequency and having one of said predetermined phases; means for deriving from said produced signal a first signal having three times the frequency of said produced signal; means for heterodyning said derived signal with a second signal derived from said subcarrier at a frequency differing from that of said first signal by an amount equal to said subcarrier frequency; means for deriving the difference frequency heterodyne component produced by said heterodyning means; and means for combining said difference frequency components with a signal proportional to said subcarrier.

10. In a color television system employing a subcarrier which at predetermined unequally displaced phases represents the red, green and blue primary image colors, respectively, and which at different amplitudes represents different saturations of said image, means for modifying said subcarrier to cause it to represent said primary colors at equally displaced phases and to increase its amplitude at said last-named phases relative to its amplitude at other phases, comprising: means for producing a signal of subcarrier frequency and of reference phase for said subcarrier; means for deriving from said reference phase signal a signal of triple the frequency of said reference phase signal; means for deriving from said subcarrier a signal of double the frequency of said subcarrier; means for heterodyning said derived signals with a signal proportional to said subcarrier and a signal derived from said subcarrier at a frequency differing from that of said triple frequency signal by an amount equal to the frequency of said subcarrier; means for deriving from said heterodyning means the heterodyne components produced at the frequency of said subcarrier; and means for combining said derived heretodyne components with a signal proportional to said subcarrier.

References Cited in the file of this patent

UNITED STATES PATENTS

| | | |
|---|---|---|
| 2,905,750 | Eley | Sept. 22, 1959 |
| 2,969,426 | Moulton | Jan. 24, 1961 |
| 3,002,049 | Loughlin | Sept. 26, 1961 |